(12) United States Patent
Sieber

(10) Patent No.: US 6,558,285 B1
(45) Date of Patent: May 6, 2003

(54) FRICTION-WHEEL PLANETARY GEAR WITH BEVEL GEARS

(75) Inventor: Udo Sieber, Bietigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/018,186

(22) PCT Filed: Jun. 20, 2000

(86) PCT No.: PCT/DE00/01916

§ 371 (c)(1),
(2), (4) Date: Dec. 10, 2001

(87) PCT Pub. No.: WO01/01018

PCT Pub. Date: Jan. 4, 2001

(30) Foreign Application Priority Data

Jun. 26, 1999 (DE) .......................... 199 29 424

(51) Int. Cl.[7] ............................... F16H 15/48
(52) U.S. Cl. ........................................ 475/193
(58) Field of Search ..................... 475/193, 194, 475/195, 215; 476/48, 61

(56) References Cited

U.S. PATENT DOCUMENTS

| 4,322,798 A | | 3/1982 | McCoin | |
| 5,984,820 A | * | 11/1999 | Wedeniwski | 475/193 |

FOREIGN PATENT DOCUMENTS

| DE | 196 44 133 A | 4/1997 |
| EP | 0 003 887 A | 9/1979 |
| GB | 459 001 A | 1/1937 |

* cited by examiner

Primary Examiner—Dirk Wright
(74) Attorney, Agent, or Firm—Michael J. Striker

(57) ABSTRACT

A friction-wheel epicyclic gear (10, 10a) is proposed. The friction-wheel epicyclic gear (10, 10a) has bevel wheels (12, 42), which roll on a friction wheel (14) and drive a gear output shaft (26). The contact pressure between the bevel wheels (12, 42) and the friction wheel (14) is variable. A detection of the slip between the bevel wheels (12, 42) and the friction wheel (14) is provided, and the contact pressure is variable as a function of the slip. In this way, the friction-wheel epicyclic gear (10, 10a) can always be operated at the slip limit, so that the wear is only slight and the efficiency is high.

7 Claims, 1 Drawing Sheet

FRICTION-WHEEL PLANETARY GEAR WITH BEVEL GEARS

BACKGROUND OF THE INVENTION

The invention is based on a friction-wheel epicyclic gear with bevel wheels. One such friction-wheel epicyclic gear, known for instance from German Patent Disclosure DE196 44 133 A1, has bevel wheels which roll on a friction wheel, and the contact pressure between the bevel wheels and the friction wheel is variable. For varying the contact pressure, this reference proposes that an rpm- or moment-dependent regulator be provided. That is, a corresponding contact pressure is associated with a certain rpm or a certain torque. So that no slip will occur, the contact pressure must be set higher than absolutely necessary. The result, however, is increased wear of the bevel wheels and/or the friction wheel. Conversely, if a certain amount of slip is tolerated, then this causes increased power losses or poorer efficiency of the friction-wheel epicyclic gear.

SUMMARY OF THE INVENTION

The friction-wheel epicyclic gear of the invention has the epicyclic gear can be driven at the slip limit. As a result, the friction-wheel epicyclic gear of the invention has less wear and at the same time has high efficiency. This is because the point of departure of varying the contact pressure of the bevel wheels at the friction wheel is not the rotary speed of the torque, but the slip.

One possibility for this is for a bevel wheel to serve not to transmit power but rather, via a pinion, to drive a shaft. By detecting and comparing the rotary speed of this shaft with the rotary speed of the shaft that is in the line of force, the slip can easily be detected and as a result the contact pressure can be varied.

A second possibility for detecting the slip is to detect the input rpm and the output rpm of the gear and to assign a value that corresponds to the output rpm of the friction-wheel epicyclic gear without slip to the applicable input rpm. The contact pressure can then be varied as a function of the difference between the output rpm and that value.

BRIEF DESCRIPTION OF THE DRAWINGS

Two exemplary embodiments of the invention are shown in the drawing and explained in further detail in the ensuing description. Shown are FIG. 1, a schematic illustration of a first exemplary embodiment of a friction-wheel epicyclic gear of the invention.

DESCRIPTION OF THE PREFERRED EMBODIMENTS

Figure 1:
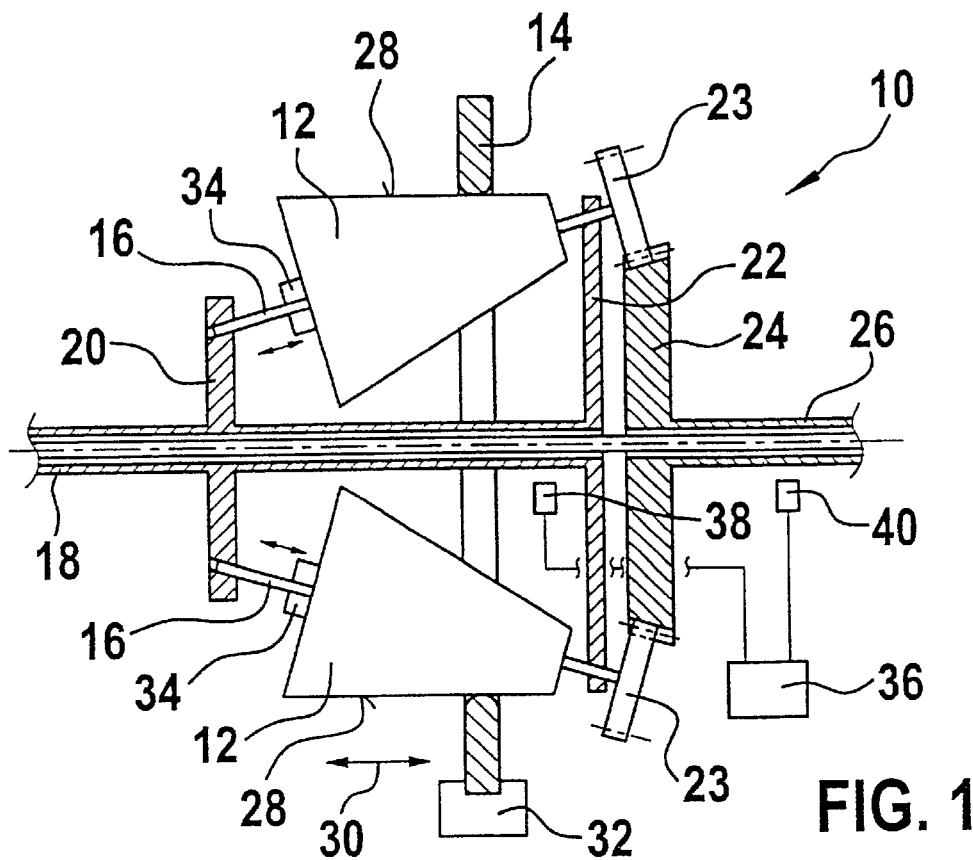

A first exemplary embodiment, shown in FIG. 1, of a friction-wheel epicyclic gear 10 has a plurality of bevel wheels 12, preferably three of them, and one friction wheel 14. The bevel wheels 12 revolve in the friction wheel 14, like the planet wheels of a planetary gear. Their shafts 16 are inclined by half the opening angle of the bevel wheels 12 relative to a rotatably supported gear input shaft 18. The shafts 16 are supported between two flanges 20, 22, which are connected to the gear input shaft 18 in a manner fixed against relative rotation. The shafts 16 protrude past one flange 22 and have pinions 23 disposed on their ends in a manner fixed against relative rotation. The pinions 23, like the planet wheels of a planetary gear, drive a rotatably supported gear output shaft 26, via a gear wheel 24 that is disposed on the gear output shaft 26 in a manner fixed against relative rotation. The gear wheel 24 and the gear output shaft 26 are disposed in alignment with the gear input shaft 18.

The friction wheel 14, disposed preferably nonrotatably and coaxially to the gear input shaft 18, is preferably embodied as a ring gear and touches the bevel wheels at outer jacket lines 28. Thus on the one hand the friction wheel 14 performs the function of the ring gear of a planetary gear; on the other, it serves as a regulating element for adjusting the rotary speed of the friction-wheel epicyclic gear 10. For use of the friction wheel 14 as regulating element, it is displaceable, in the axial direction of the gear input shaft 18 indicated by a double arrow 30, via a final control element 32. Thus the output rpm of the friction-wheel epicyclic gear can be varied in an infinitely graduated way for a fixed input rpm. It is also possible for the output rpm to be kept constant while the input rpm varies. Contact pressure final control elements, represented by reference numeral 34, are provided in the bevel wheels 12 and at the points of contact between the friction wheel 14 and the bevel wheels 12, along the jacket lines 28, adjust the contact pressure required for power transmission via frictional engagement.

For the frictional engagement between the bevel wheels 12 and the friction wheel 14, the product of the normal force and the traction coefficient must be greater than the tangential force, so that no slip will arise between the bevel wheels 12 and the friction wheel 14. For reasons of wear and efficiency, however, the normal force should be no higher than absolutely necessary. It is therefore advantageous to keep it at the slip limit. To that end, detection of the slip between the bevel wheels 12 and the friction wheel 14 is provided, and the contact pressure is variable as a function of the slip. A device 36 for detecting a drive-side rotary speed and a power-takeoff-side rotary speed is suitable for this purpose. In the device 36, a value that corresponds to the power-takeoff-side rotary speed of the friction-wheel epicyclic gear 10 without slip is associated with the drive-side rotary speed. This value for the applicable rotary speed can be calculated and stored in memory in the device 36. The drive force can then be varied as a function of the difference between the power-take-off-side rotary speed and this value.

In the first exemplary embodiment, the device 36 serves to detect the rotary speeds of the gear input shaft 18 and the gear output shaft 26. As can be seen, the device 36 can detect the speed of revolution of the bevel wheels 12 about a common axis—in this case the gear input shaft 18—and, via the ratio of the number of teeth of a pinion 23 and of a gear wheel 24, also the rotary speed of at least one bevel wheel 12 about its own axis.

For detecting the rotary speeds, two magnetic-field-sensitive sensors 38, 40 are provided, which are preferably inductive, Hall, GMR (Giant Magnetoresistance) or AMR (Anisotropic Magnetoresistance) sensors. In operation of the friction-wheel epicyclic gear 10, the sensors generate alternating voltage signals, which are fed into the device 36. From the displacement of the alternating voltage signals from one another, the slip can.then be ascertained. At the locations of the gear input shaft 18 and gear output shaft 26 where the sensors 38, 40 are respectively disposed, a plurality of magnetic poles or teeth can be disposed on the circumference, with which poles or teeth the sensors 38, 40 then cooperate. The magnetic poles or teeth can also be disposed on respective disks that are secured to the gear input shaft 18 and the gear output shaft 26.

For detecting the rotary speeds, incremental disks can alternatively be provided, which are mounted on the gear input shaft 18 and on the gear output shaft 26 and which in this case are scanned by optical sensors 38, 40. The optical sensors 38, 40 likewise generate alternating voltage signals that are fed into the device 36. From the displacement of the alternating voltage signals from one another, the slip can again be ascertained and the contact pressure can be adapted.

Figure 2:
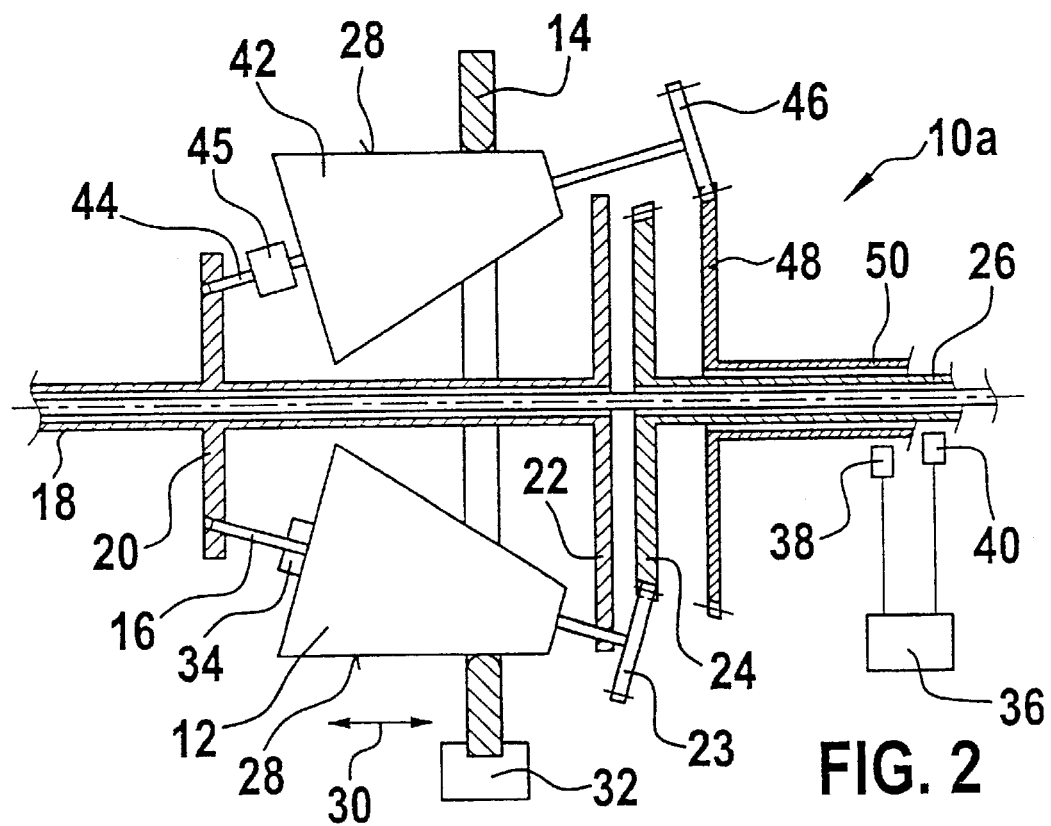
FIG. 2, a schematic illustration of a second exemplary embodiment of the gear of the invention.

In FIG. 2, a friction-wheel epicyclic gear 10*a* is shown as the second exemplary embodiment. The friction-wheel epicyclic gear 10*a* has one additional bevel wheel 42. The bevel wheel 42 has a contact pressure final control element 44. The shaft 45 of the bevel wheel 42 protrudes beyond the flange 22 and on its end has a pinion 46 which drives a gear wheel 48. The gear wheel 48 axially adjoins the gear wheel 24 and is secured on a rotatably supported hollow shaft 50 that is disposed coaxially to the gear output shaft 26. Once again, sensors 38, 40 are also provided for detecting the rotary speeds of the hollow shaft 50 and the gear output shaft 26, respectively, and are likewise connected to the device 36. Thus the rotary speeds of the gear output shaft 26 and of the hollow shaft 50 can be detected and compared, and as a function of the difference in the rotary speeds, the contact pressure can be varied.

The principle of slip detection in the second exemplary embodiment is based first on the fact that no power is transmitted by the additional bevel wheel 42. As a result, the additional bevel wheel 42 rotates without slip in operation. Since no power is transmitted, only a slight contact pressure has to be exerted by the contact pressure final control element 44. The rotary speed measured at the hollow shaft 50 is thus equivalent to an output rpm of the friction-wheel epicyclic gear 10*a* without slip. Thus once again the slip can be ascertained by way of the comparison of the rotary speeds of the hollow shaft 50 and the gear output shaft 26. By the ratios of the numbers of teeth of the pinions 23, 46 and the numbers of teeth of the gear wheels 24, 48, the actual rpm of the bevel wheels 12 or of the bevel wheel 42 can thus readily be ascertained.

If, the gear ratio of the pinion 23 and of the gear wheel 24 is equal to the gear ratio of the additional pinion 46 and the additional gear wheel 48, then in the slipless state, the difference in the rotary speeds, of the gear wheel 24 and the additional gear wheel 48 equals zero. Detecting the slip thus becomes especially simple.

It should be pointed out that the other components shown have the same reference numerals as the components in the first exemplary embodiment, and that they have both the same design and the same function.

An alternative possibility for slip detection is for the gear wheel 24 to drive a first input shaft and the additional gear wheel 48 to drive a second input shaft of an epicyclic gear. The gear ratio of the epicyclic gear is designed such that at the same rotary speeds of the input shafts, the rotary speed of the output shaft is zero. The rpm of the output shaft can be detected with a sensor 38 and transmitted to the device 36. If the slip is not equal to zero, then the output shaft is rotating. This is detected by the sensor 38. In other words, once again the contact pressure can be varied as a function of the signal. Thus one sensor 40 can be dispensed with.

What is claimed is:

1. A friction-wheel epicyclic gear, comprising a power takeoff shaft; a friction wheel; bevel wheels which roll on said friction wheel; a gear wheel by which said bevel wheels drive said power takeoff shaft, said bevel wheels and said friction wheels being arranged so that a contact pressure between said bevel wheel and said friction wheel is variable; means for detecting a slip between said bevel wheels and said friction wheel, and said contact pressure being variable as a function of the slip; an additional bevel wheel with an additional pinion provided on said additional bevel wheel and meshing with an additional gear wheel; and a device detecting and comparing rotary speeds of said gear wheel and said additional gear wheel, said contact pressure being variable as a function of a difference in the rotary speeds.

2. A friction-wheel epicyclic gear as defined in claim 1, wherein a gear ratio of said gear wheel and of said pinion that drives said gear wheel is equal to a gear ratio of said additional gear wheel and said additional pinion so that in a slipless state a difference in the rotary speeds of said gear wheel and said additional gear wheel is zero.

3. A friction-wheel epicyclic gear as defined in claim 1; and further comprising a first input shaft and a second input shaft and output shafts, said gear wheel driving said first input shaft while said additional gear wheel driving said second input shaft, a gear ratio of, the epicyclic gear being designed such that at equal rotary speeds at said input shafts, rpm of said output shafts is zero; a sensor with which a rotary speed of said output shafts is detected and transmitted to said device, the contact pressure being variable as a function of a signal.

4. A friction-wheel epicyclic gear as defined in claim 1; and further comprising means for detecting rotary speeds including discs provided on their circumference with a plurality of elements, and two magnetic-field sensitive sensors which scan said elements and generate alternating voltage signals that are supplied to said device, said slip is ascertainable from a displacement of the alternating voltage signals.

5. A friction-wheel epicyclic gear as defined in claim 4, wherein said elements are formed as elements selected from the group consisting of poles and teeth.

6. A friction-wheel epicyclic gear as defined in claim 4, wherein said sensors are sensors selected from the group consisting of Hall sensors, GMR sensors and AMR sensors.

7. A friction-wheel epicyclic gear as defined in claim 1; and further comprising means for detecting the rotary speeds and including incremental discs, and sensors which scan said incremental discs and generate alternating voltage signals which are supplied to said device, the slip being ascertainable from a displacement in the alternating voltage signals.

* * * * *